(12) United States Patent
Kamata

(10) Patent No.: US 6,980,368 B2
(45) Date of Patent: Dec. 27, 2005

(54) OPTICAL ADAPTER AND LENS-FITTED PHOTO FILM UNIT

(75) Inventor: Kazuo Kamata, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 12 days.

(21) Appl. No.: 10/653,954

(22) Filed: Sep. 4, 2003

(65) Prior Publication Data

US 2004/0047046 A1  Mar. 11, 2004

(30) Foreign Application Priority Data

Sep. 5, 2002  (JP)  .............. 2002-260424

(51) Int. Cl.$^7$ ............................................. G02B 13/08
(52) U.S. Cl. ................. 359/668; 396/71; 396/544
(58) Field of Search .................. 359/511, 643, 647, 359/646, 668, 808, 811, 818, 819; 396/71, 396/73, 84, 148, 373, 378, 382, 439, 448, 396/529, 530, 544, 661

(56) References Cited

U.S. PATENT DOCUMENTS

| | | | |
|---|---|---|---|
| 2,674,932 A | * | 4/1954 | Tydinfs et al. .............. 396/353 |
| 5,371,566 A | * | 12/1994 | Asakura ...................... 396/71 |
| 6,072,636 A | | 6/2000 | Sato ........................... 359/668 |

FOREIGN PATENT DOCUMENTS

| | | | | |
|---|---|---|---|---|
| JP | 11064962 A | * | 3/1999 | .......... G03B 17/24 |
| JP | 2000122233 A | * | 4/2000 | ............ G03C 3/00 |

OTHER PUBLICATIONS

Patent Abstracts of Japan, Murooka Takashi, Date of publication No. 11-064962, Publication of application May 3, 1999, Camera, Image Reproducing Method and Device Therefor.
Patent Abstracts of Japan, Yoshihara Tomoko et al., "Film Unit with Lens", Publication No. 2000-122233, Date of publication of application Apr. 28, 2000.

* cited by examiner

*Primary Examiner*—Thong Nguyen
*Assistant Examiner*—Arnel C. Lavarias
(74) *Attorney, Agent, or Firm*—Young & Thompson

(57) ABSTRACT

An optical adapter comprises an adapter body and a lens member. The lens member is a cylindrical lens having one or more curved surfaces, and has a function to extend an optical image in a horizontal direction. A taking lens and a viewfinder are arranged vertically, and the optical axes of the taking lens and the viewfinder coincide with each other in the horizontal direction. When the adapter body is attached to the front side of the lens-fitted photo film unit, the front surfaces of the taking lens and the viewfinder are covered with the lens member. The center of the lens member in the horizontal direction coincides with centers of the taking lens and the viewfinder in the horizontal direction.

4 Claims, 6 Drawing Sheets

FILM FEEDING DIRECTION

OPTICAL ADAPTER AND LENS-FITTED PHOTO FILM UNIT

BACKGROUND OF THE INVENTION

1. Field of the Invention

The present invention relates to an optical adapter, and more particularly to an optical adapter for a camera having a cylindrical lens to form an image in which vertical and horizontal magnifications are different, and a lens-fitted photo film unit to which the optical adapter is attached.

2. Description of the Prior Arts

In order to apply a visual effect in a photographed picture, it is known to attach an optical adapter to a front surface of a taking lens in photographing a human subject. For example, there is an optical adapter which makes the human subject look thinner or fatter than actual. Such optical adapter is disclosed in U.S. Pat. No. 6,072,636 and Japanese Patent Laid-Open Publication No. H11-64962, and so on. The optical adapter disclosed in these publications forms an image so as to differentiate vertical and horizontal magnifications of the human subject by using a cylindrical lens.

In Japanese Patent Laid-Open Publication No. 2000-122233, the cylindrical lens as the optical adapter is provided in a lens-fitted photo film unit into which an unexposed photo film is pre-loaded. The optical adapter can differentiate the vertical and horizontal magnifications of the subject image in the photo film.

In the optical adapter described in the above-mentioned publications, however, the taking lens is covered by the cylindrical lens, while a viewfinder is not. Accordingly, in the event of using a normal camera or a lens-fitted photo film unit except for a single-lens reflex camera, a photographer cannot confirm the change in the vertical and horizontal magnifications through the viewfinder. If the photographer takes a photograph without being aware that the optical adapter is attached to the camera, it is caused to make a printed photograph which is not intended by the photographer.

In Japanese Patent Laid-Open Publication No. 2000-122233, the viewfinder is covered by the cylindrical lens. However, since the taking lens and the viewfinder are respectively covered by different cylindrical lenses. It is necessary to cover the taking lens and the viewfinder separately. Such operation is troublesome, and may cause a mistake.

SUMMARY OF THE INVENTION

An object of the present invention is to provide an optical adapter capable of confirming by a simple operation, that photographing is performed in a state that the vertical and horizontal magnifications are different.

In order to achieve the above object, an optical adapter of the present invention is attached to a camera having a taking lens and a viewfinder, and provided with a lens member constituted of a cylindrical lens, which covers the taking lens and the view finder.

In the optical adapter, the lens member has a single curved surface. Optical axes of the taking lens and the viewfinder lens respectively pass through a center of the curved surface.

In addition, the lens member has first and second curved surfaces which are curved in the same direction. The optical axis of the taking lens passes through a center of the first curved surface, while the optical axis of the viewfinder passes through a center of the second surface.

According to the present invention, both the taking lens and the viewfinder are covered with the lens member from each front surface side, so that a photographer can take a photograph with confirming the respective changes of the vertical and horizontal magnifications of the photographed image through the viewfinder. Additionally, since the taking lens and the viewfinder are covered with only one lens member, the switching operation for the normal photographing is easy to perform so that an operation mistake can be prevented.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
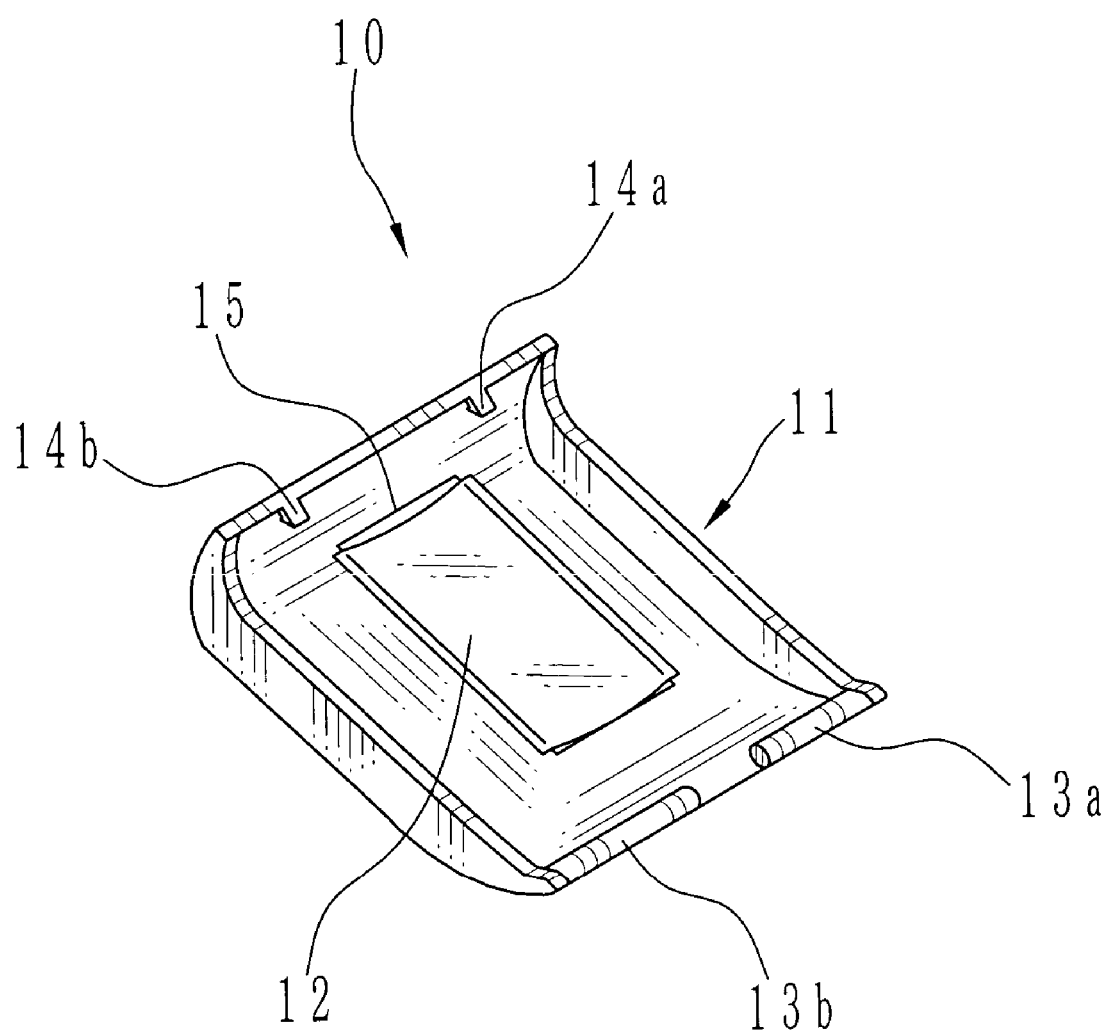
FIG. 1 is an outline perspective view of an optical adapter of the present invention.

In FIG. 1, an optical adapter 10 is constituted of an adapter body 11 and a lens member 12. The lens member 12 is a cylindrical lens having a single convex surface (cylindrical surface) in a subject side. The combination of the cylindrical lens and a taking lens causes astigmatism, so that an optical subject image is extended in a certain direction.

The adapter body 11 is provided with a pair of shafts 13a and 13b, and engaging claws 14a and 14b. A lens holding frame 15 is provided in a center of the adapter body 11. The lens member 12 is attached to the lens holding frame 15.

Figure 2A:
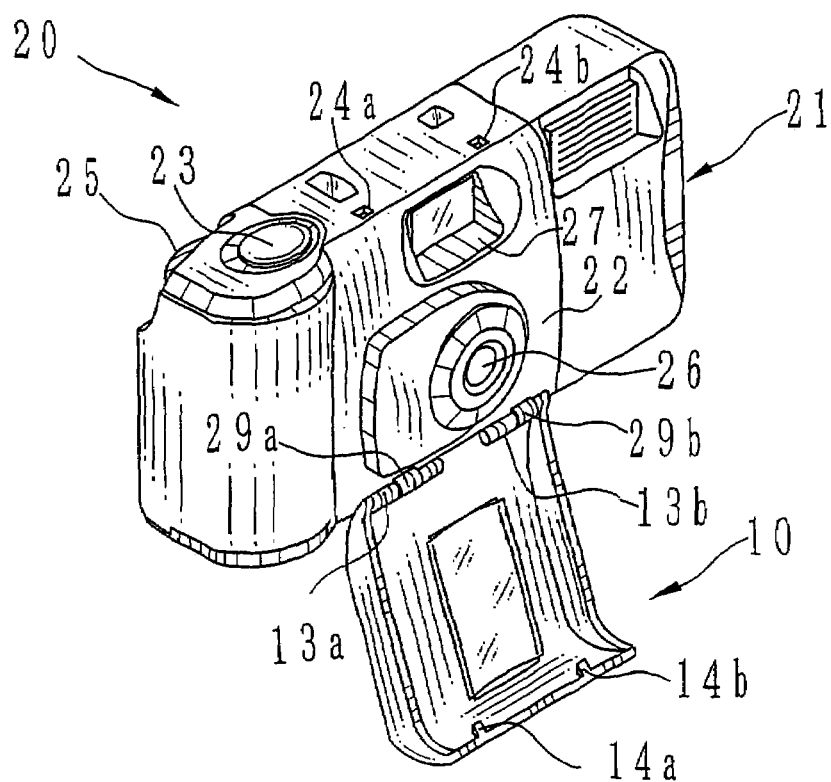
FIGS. 2A and 2B are perspective views of a lens-fitted photo film unit to which the optical adapter is attached.

In FIG. 2A, the optical adapter 10 is attached to a lens-fitted photo film unit 20 in a detachable manner. The lens-fitted photo film unit 20 has a unit body 21 and an outer label 22 for covering a center portion of the unit body 21. A photo film 52 and a cartridge 53 (see FIG. 3) are pre-loaded in the unit body 21, and a photographing mechanism including a shutter device is contained therein. A shutter button 23, engaged holes 24a and 24b, and so forth are provided in the top surface of the unit body 21. The engaged holes 24a and 24b are respectively engaged with engaging claws 14a and 14b of the optical adapter 10. A part of a winding dial 25 for winding the exposed photo film 52 is exposed from a rear surface of the unit body 21.

Figure 2B:
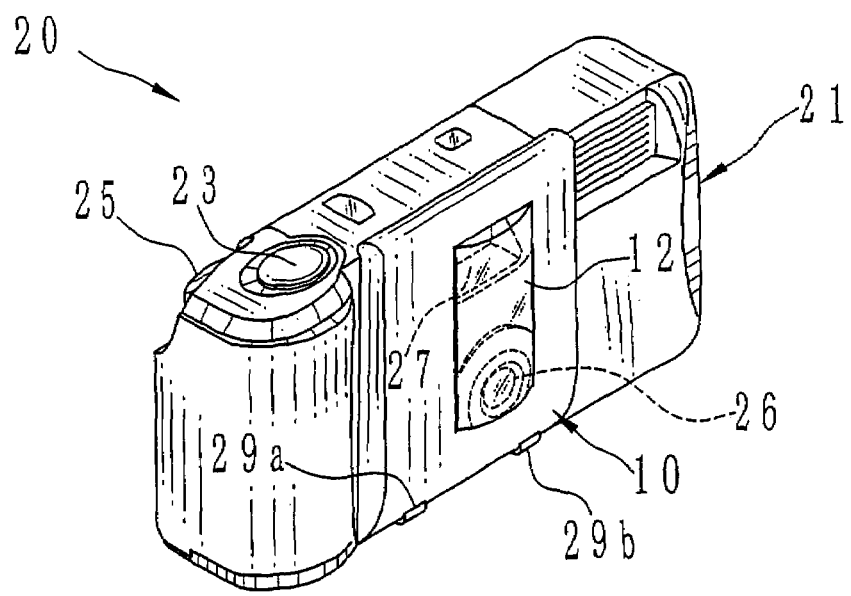

A taking lens 26, a viewfinder 27, and so forth are provided in a front surface of the unit body 21. Further, there are adapter holding portions 29a and 29b for holding the shafts 13a and 13b in the lower part of the front surface of the unit body 21. Thereby, the optical adapter 10 is attached to the lens-fitted photo film unit 20 in a rotatable manner around the shafts 13a and 13b between an open position shown in FIG. 2A and a locked position shown in FIG. 2B. In the locked position, the engaging claws 14 and 14b are engaged with the engaged holes 24a and 24b to hold the adapter 10 in front of the unit body 21.

Figure 3:
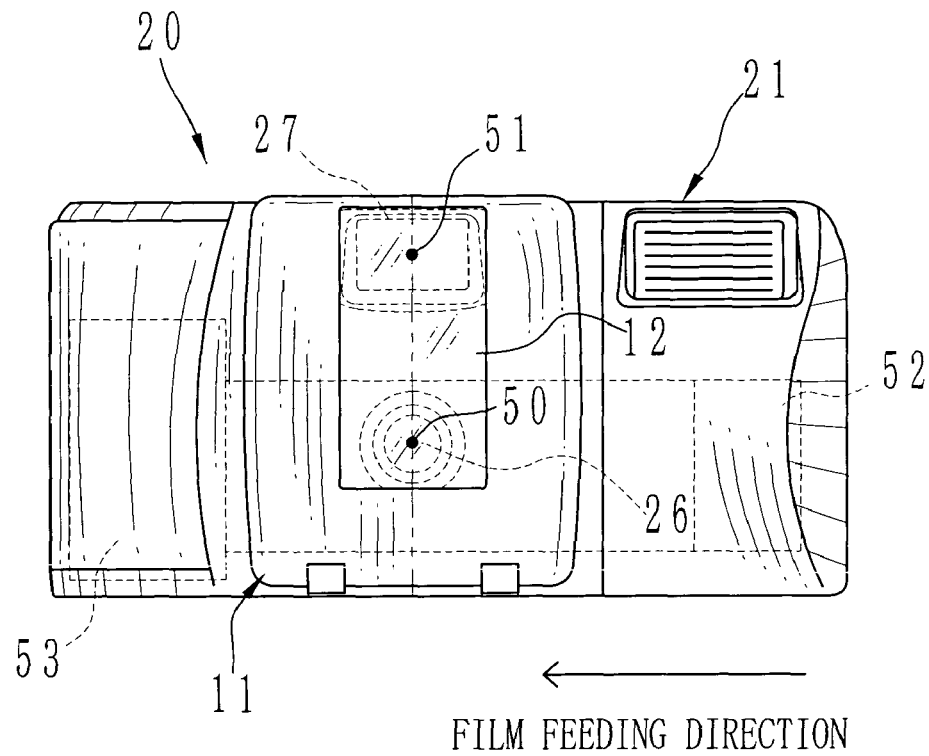
FIG. 3 is a front view of the lens-fitted photo film unit.
Figure 4:
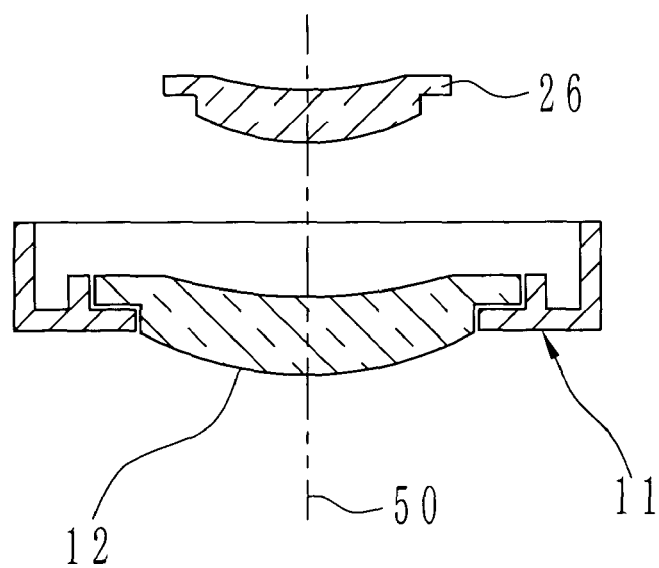
FIG. 4 is a sectional view of the optical adapter and a taking lens.

As shown in FIGS. 3 and 4, when the optical adapter 10 is in the locked position, the taking lens 26 and the viewfinder 27, which are arranged in a vertical direction, are covered with the lens member 12. The position of an optical axis 50 of the taking lens 26 and the position of an optical axis 51 of the viewfinder 27 are designed so as to coincide with each other in a horizontal direction, which is the same as a film feeding direction to feed the photo film 52 in FIG. 3. The optical axis 50 of the taking lens 26 passes through the center of the lens member 12 in the horizontal direction, which means the center of the cylindrical surface with respect to the light refractive direction of the lens member 12 (the horizontal direction in this embodiment). Likewise, the optical axis 51 of the viewfinder 27 passes through the center of the cylindrical surface of the lens member 12 in the horizontal direction.

Next, the operation of the above embodiment is explained. The optical adapter 10 attached to the lens-fitted photo film unit 20, is movable between the open position and the locked position. A photographer rotates the optical adapter 10 to the open position to carry out normal photography without using the lens member 12. In the normal photography, the optical adapter 10 may be detached from the lens-fitted photo film unit 20.

In photographing a subject with different vertical and horizontal magnifications, the photographer moves the optical adapter 10 to the locked position. The front side of the taking lens 26 and the viewfinder 27 are covered by single lens member 12.

The photographer brings the eye close to the viewfinder, and then observes a subject image through the viewfinder 27 for framing. Thereafter, if the photographer pushes down the shutter button 23, the shutter release is performed to expose the subject image to the photo film 52.

Figure 5:
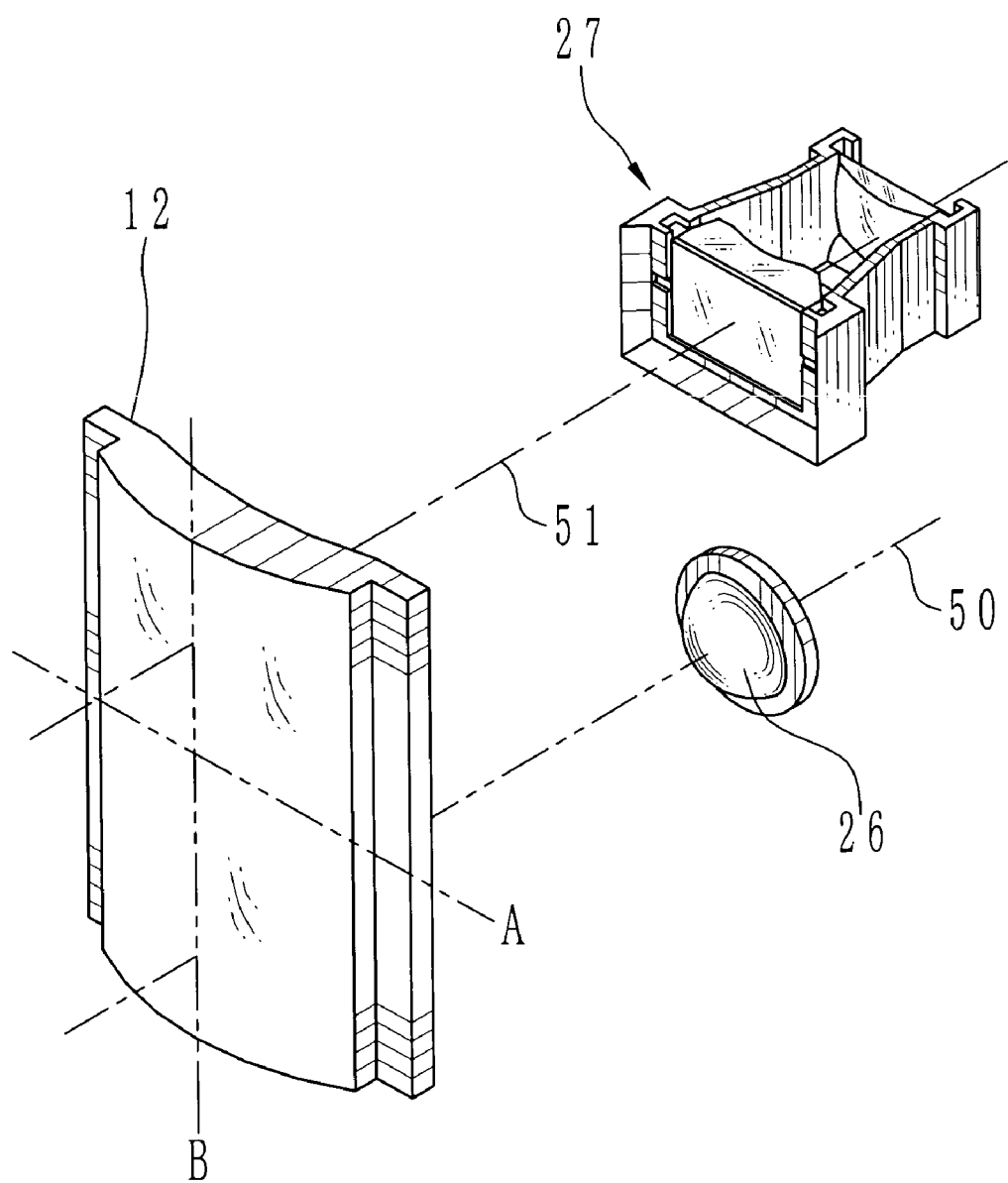
FIG. 5 is a perspective view of a photographic optical system.
Figure 6A:
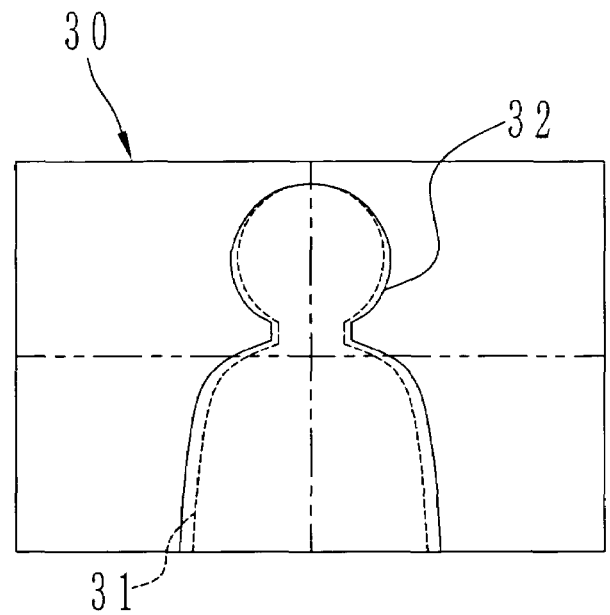
FIGS. 6A and 6B are explanatory views of an actual human subject and a photographed image.
Figure 6B:
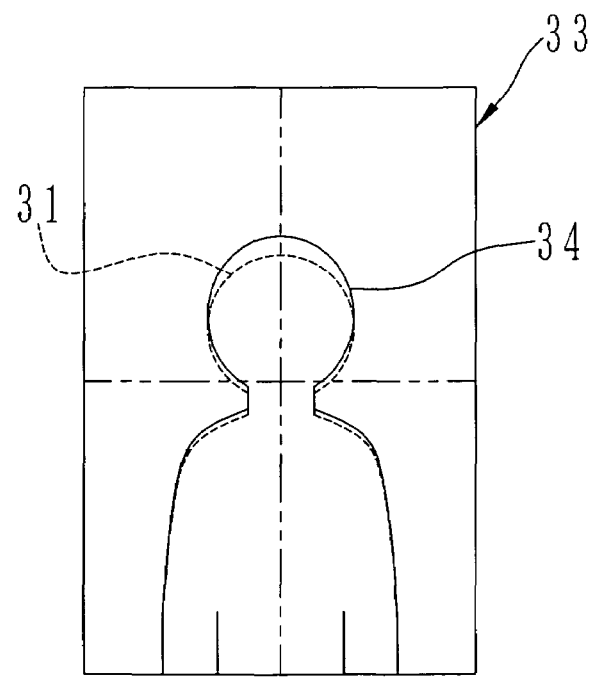

As shown in FIG. 5, subject light is incident on the taking lens 26 and the viewfinder 27 through the lens member 12. In the photography optical system composed of the lens member 12 and the taking lens 26, the focal length in the horizontal direction shown in a dashed line A is longer than the focal length in the vertical direction shown in a dashed line B. Thus, as shown in FIG. 6A, the optical image of the actual subject 31 becomes enlarged in the horizontal direction to form a photographic image 32 in a photographic area 30. Accordingly, the photographed image becomes fatter than the actual subject 31. In the viewfinder optical system composed of the lens member 12 and the viewfinder 27, the optical image of the subject is also enlarged in the horizontal direction as shown in FIG. 6A. Thereby, when the lens-fitted photo film unit 20 is held in a horizontal position shown in FIG. 3 in photographing, the photographer can take a photograph after confirming the photographic image 32 through the viewfinder 27.

In a vertical position where the lens-fitted photo film unit 20 is turned by almost 90 degree from the position in FIG. 3, the optical image of the subject 31 is enlarged in the vertical direction to form a photographic image 34 in a photographic area 33. Consequently, the subject 31 is photographed so as to look thinner than actual.

If the photographer wants to take a photograph so as to make the subject 31 look fatter than actual, the lens-fitted photo film unit 20 is held in the horizontal position in photography. Meanwhile, if the photographer wants to take a photograph so as to make the subject 31 look thinner than actual, photography is carried out in the vertical position.

Figure 7A:
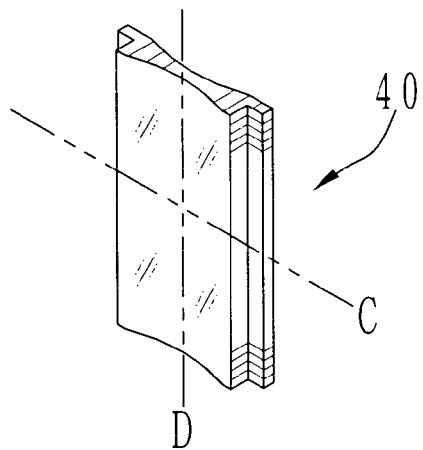
FIGS. 7A, 7B, and 7C are perspective views of other examples of a lens member of the optical adapter.

Next, the variations of the lens member 12 of the optical adapter 10 are explained. In FIG. 7A, a lens member 40 is a cylindrical lens which has a single concave surface in the horizontal direction C in the Figure. On the contrary to the lens member 12 in the above embodiment, in the photography optical system composed of the lens member 40 and the taking lens 26, since the focal length in the horizontal direction shown by a dashed line C is shorter than the focal length in the vertical direction shown in a dashed line D, the optical subject image is compressed in the horizontal direction. Consequently, the subject 31 is photographed so as to look thinner than actual.

If the photographer wants to take a photograph so as to make the subject 31 look thinner than actual with the lens member 40, the lens-fitted photo film unit is held in the horizontal position. On the other hand, if the photographer wants to take a photograph so as to make the subject 31 look fatter than actual, photography is carried out in the vertical position.

Figure 7B:
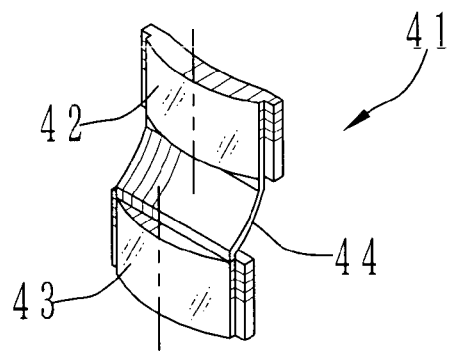

The lens members 12 and 40 are respectively constituted of a cylindrical lens having a single cylindrical surface. Instead, as a lens member 41 shown in FIG. 7B, two cylindrical lenses 42 and 43 having cylindrical surfaces in the horizontal direction in the Figure may be connected to a connection part 44. Two lenses 42 and 43 are molded integrally so as to coincide the optical axis in the horizontal direction with each other, and therefore, the positional accuracy is extremely high. The optical function of the lens member 41 is the same as that of the lens member 12.

Figure 7C:
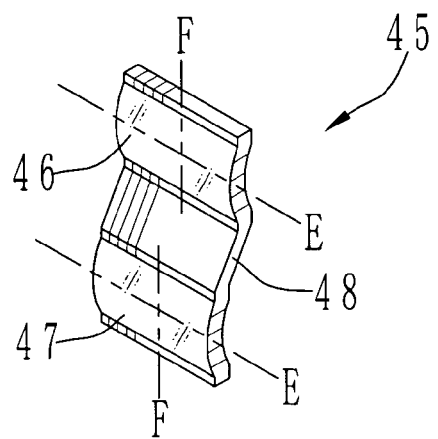

In the example shown in FIG. 7C, a lens member 45 has two cylindrical lenses 46 and 47 that are integrally molded with a connection part 48. In this case, the focal length in the vertical direction shown by a dashed line F is longer than the focal length in the horizontal direction shown by a dashed line E, so that the optical subject image is vertically enlarged. Accordingly, the subject 31 is photographed so as to look thinner than actual when the lens-fitted photo film unit 20 with the lens member 45 is held in the horizontal position. On the other hand, when the lens-fitted photo film unit 20 is held in the vertical position, it is possible to photograph so as to make the subject 31 look fatter than actual.

In the above embodiments, the optical adapter is applied to the lens-fitted photo film unit. The optical adapter of the present invention is also applicable to a camera.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical adapter being attached to a camera having a taking lens and a viewfinder, said optical adapter comprising:

a lens member covering said taking lens and said viewfinder, wherein the lens member is constructed and arranged so as to cover the taking lens and the viewfinder where the taking lens and the viewfinder are separated from one another, and the taking lens and the viewfinder have respective optical axes separated from one another;

wherein said lens member is a cylindrical lens.

2. An optical adapter as claimed in claim 1, wherein said lens member has a single cylindrical surface, and both the optical axis of said taking lens and the separate optical axis of said viewfinder pass through a center of said cylindrical surface.

3. An optical adapter as claimed in claim 1, wherein said lens member has a first cylindrical surface and a second cylindrical surface curved in the same direction, said optical axis of said taking lens passes through a center of said first cylindrical surface and said separate optical axis of said viewfinder passes through a center of said second cylindrical surface.

4. An optical adapter as claimed in claim 1, wherein said camera is a lens-fitted photo film in which a photo film is pre-loaded, and both the optical axis of said taking lens and the separate optical axis of said viewfinder exist in the same position in a feeding direction of said photo film.

* * * * *